US005299824A

United States Patent [19]

Roberts et al.

[11] Patent Number: 5,299,824

[45] Date of Patent: Apr. 5, 1994

[54] WHEEL CHAIR WITH ROTATABLE TRAY

[76] Inventors: Richard D. Roberts, 545 Whitman Blvd., Elyria, Ohio 44035; Matthew J. Murphy, 3766 Lynne Dr., Sheffield Lake, Ohio 44054

[21] Appl. No.: 964,100

[22] Filed: Oct. 21, 1992

[51] Int. Cl.[5] .......... B60R 9/00

[52] U.S. Cl. .......... 280/304.1; 297/DIG. 4; 297/155; 108/44

[58] Field of Search .......... 280/304.1, 250.1; 297/DIG. 4, 154, 155, 166; 108/44, 49; 224/42.44, 42, 43

[56] References Cited

U.S. PATENT DOCUMENTS

| | | | |
|---|---|---|---|
| 3,860,285 | 1/1975 | Hartman | 297/DIG. 4 |
| 4,455,008 | 6/1984 | Mackew | 297/194 |
| 4,566,732 | 1/1986 | Ostergaard, II et al. | 297/DIG. 4 |
| 4,580,803 | 8/1986 | Davis | 280/304.1 |
| 4,632,451 | 12/1986 | Lee | 280/304.1 |
| 4,705,287 | 11/1987 | Cumbie | 280/304.1 |
| 4,779,884 | 10/1988 | Minati | 280/304.1 |
| 4,795,182 | 1/1989 | Dyess et al. | 280/304.1 |
| 4,852,499 | 8/1989 | Ozols | 108/44 |
| 4,867,506 | 9/1989 | Chavez | 297/188 |
| 4,878,685 | 11/1989 | Bahm | 280/304.1 |
| 4,919,443 | 4/1990 | Kehler | 280/304.1 |
| 5,118,127 | 6/1992 | Partington | 280/304.1 |
| 5,139,309 | 8/1992 | Kornreich | 297/DIG. 4 |
| 5,180,181 | 1/1993 | Letechipia | 280/304.1 |

*Primary Examiner*—Margaret A. Focarino
*Assistant Examiner*—Kevin Hurley
*Attorney, Agent, or Firm*—Milton M. Field

[57] ABSTRACT

A wheel chair with a rotating tray which may be rotated from a first position generally parallel to a back or rear support member. In an alternative position of the rotating tray, the tray is rotated from the first position generally parallel to the arm supports through ninety degrees into a vertical position whereby the user of the wheel chair is able to get up from and return to a bottom seat of the wheel chair.

6 Claims, 7 Drawing Sheets

WHEEL CHAIR WITH ROTATABLE TRAY

This invention relates to a wheel chair that is provided with a rotatable tray and, more particularly, to such a combination wherein the tray may be rotated around the wheel chair to be disposed generally parallel to and behind the back or rear seat support for the wheel chair.

BACKGROUND OF THE INVENTION

Heretofore, it has been known to use tray members attached to a wheel chair, usually to the arm supports, and then detach the tray when not in use. The principal uses of the tray itself is to provide a support for food trays, to provide a writing back up surface, or to provide a support for books, magazines or the like.

The tray itself is in the way of the user once the foregoing uses have terminated and it is desired simply to move the user from one place to another. An additional shortcoming of presently used devices is that the tray becomes separated from the wheel chair so that it becomes necessary to remember where it has been stored and to retrieve it when a tray usage is desired.

SUMMARY OF THE INVENTION

In accordance with the present invention, the foregoing imitations and shortcomings of the prior art are effectively overcome. In particular, the present invention provides a wheel chair and a rotatable tray which remain intact at all times. When the tray usage is completed, the tray is rotated through approximately 270 degrees and stored behind a back or rear seat support for the wheel chair. As an optional feature, the tray may be rotated separately from the previously described rotating means through approximately 90 degrees and re-locked in an up or vertical position which permits a user of the wheel chair to get up from and return to a bottom seat member.

The inherent advantages and improvements of the present invention will become more evident upon reference to the following detailed description of the invention and by reference to the attached drawings wherein.

DETAILED DESCRIPTION OF THE INVENTION

Figure 1:
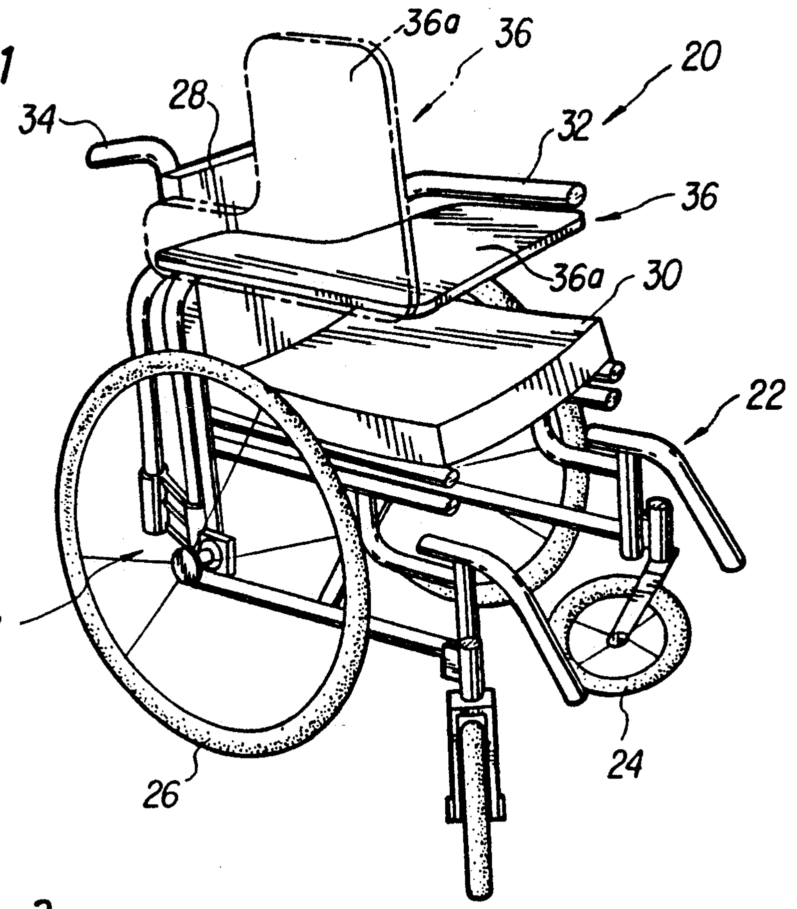
FIG. 1 is a perspective view of a wheel chair and tray assembly made in accordance with the present invention.

Referring to FIG. 1 of the drawings, there is shown a wheel chair indicated generally at 20. The wheel chair is provided with a frame structure indicated generally at 22. Other conventional features of wheel chair 20 include front wheels 24 and larger wheel means 26 which are customarily provided with hand propelling means, not shown.

The wheel chair further has a generally vertical rear or back seat member 28 and a generally horizontal bottom seat member 30. Conventional arm supports, having generally horizontal top surfaces, 32 and rear push means 34 are provided.

The pivotal tray means of the present invention is shown generally at 36 and has a planar surface *36a*. The means for rotating the rotatable means for holding tray means 36 and rotating it in a horizontal plane is shown generally at 38 in FIGS. 1-5, 9 and 10.

In FIG. 1, the solid depiction of the tray means 36 indicates the position of the tray means when it is in use. The tray means 36 is rotatable through approximately 90 degrees to the phantom position in FIG. 1. A means for moving the tray means 36 to this vertical position is described in greater detail in the description of FIG. 6 hereinafter.

Figure 2:
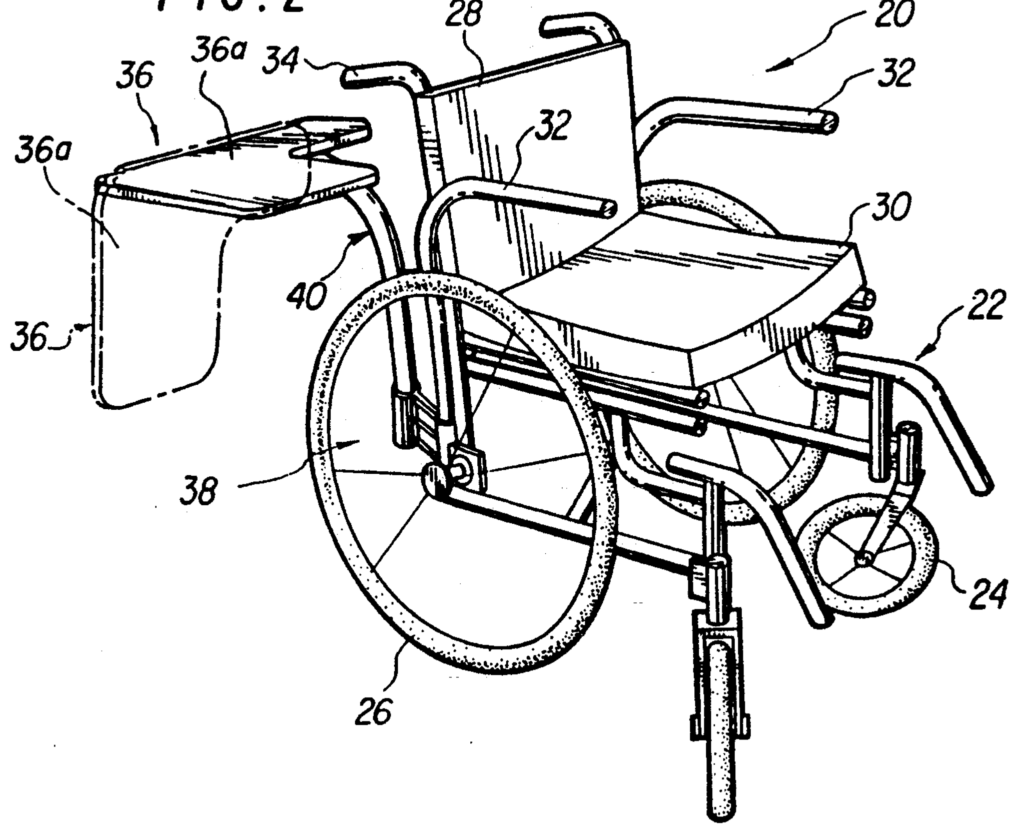
FIG. 2 is a perspective view similar to FIG. 1 but illustrating different positions of the tray.
Figure 9:
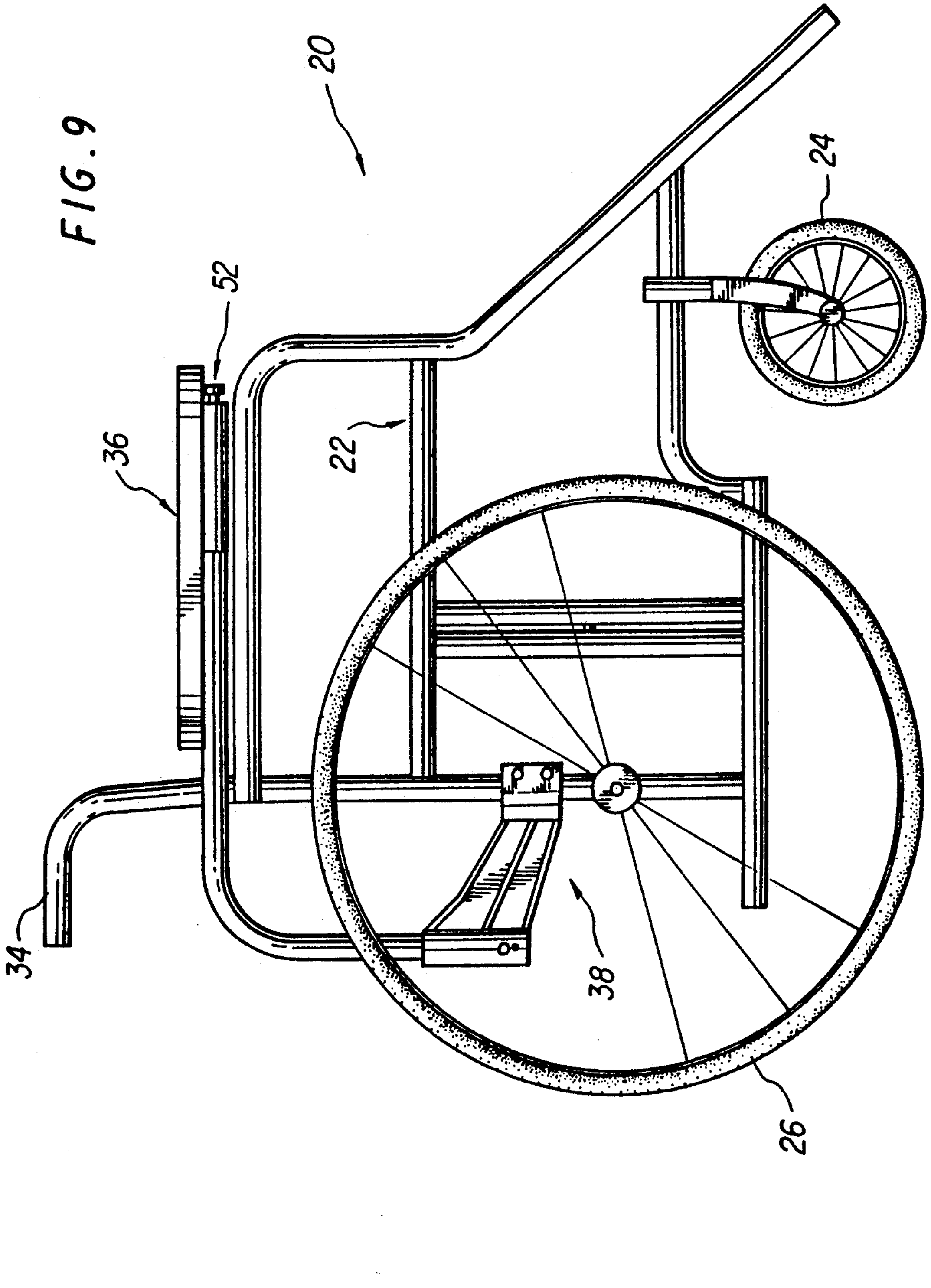
FIG. 9 is a side elevational view of FIG. 1 with portions removed and drawn to an enlarged scale.
Figure 10:
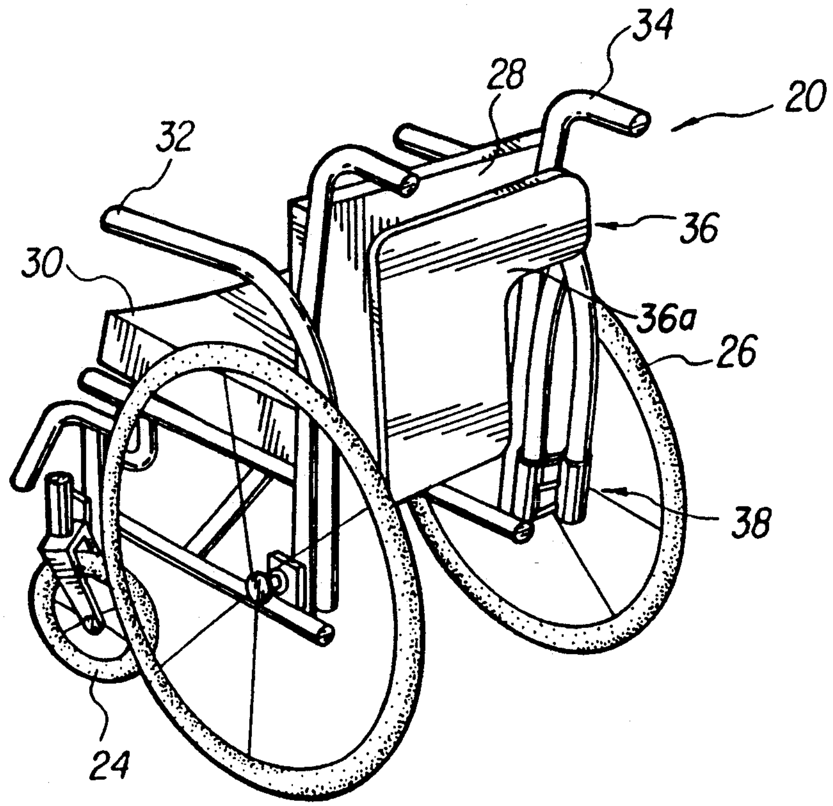
FIG. 10 is a perspective view of the wheel chair of FIG. 1 illustrating a final position for the tray.

In FIG. 2, the solid line showing of pivotal tray means 36 indicates its position after it has been rotated from the solid line representation of FIG. 1 through 90 degrees. The manner of effecting this is more fully described hereinafter in connection with FIGS. 3–5. Tray means 36 is then lowered or rotated through approximately 90 degrees to the phantom position in FIG. 2 through the mechanism 52 of FIG. 6 and positioned as shown in FIG. 9. The mechanism of rotatable means 36 is then used to rotate tray means 36 through approximately 180 degrees so as to position tray means 36 behind the rear or back seat 28 in FIG. 10.

Figure 5:
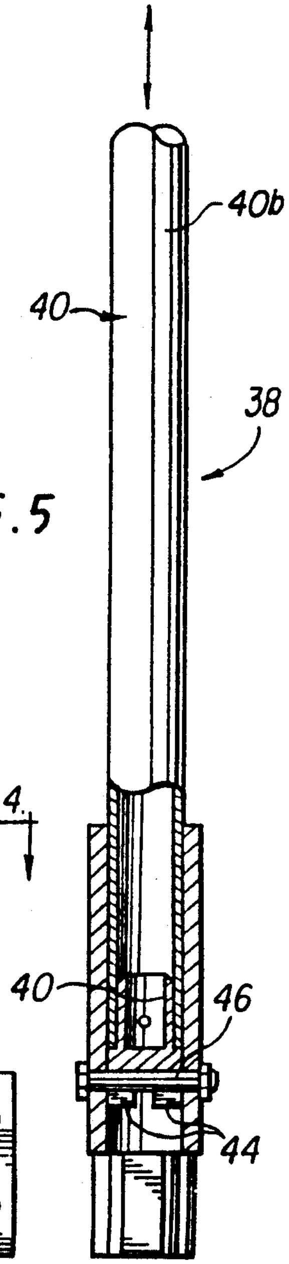
FIG. 5 is a front elevational view of FIG. 3 taken partially in vertical cross section.

The mechanism for rotating the tray means 36 in a generally horizontal plane will now be explained by reference to FIGS. 3–5. There is shown rotatable means indicated generally at 38. A rotatable hollow tube member 40 has a horizontal portion *40a* (see FIG. 9) suitably secured to tray 36, not shown. Tube member 40 has a vertical portion *40b* secured to an inner, generally cup-shaped, vertical member 41 by means of pin member 42. The cup-shaped member 41 is provided with depending, locking tabs or ears 44 which straddle a fixed bolt and nut assembly 46. The locking tabs or ears 44 are cruciform in a bottom plan view so that the rotatable tubular member may be positioned in 90 degree increments after being lifted vertically in FIGS. 3 and 5 above bolt 46, rotated abut a vertical axis to the desired position and then lowered onto bolt 46 where it is in locked position.

The mechanism for attaching the rotatable means to the wheel chair 20 further includes a generally trapezoidal arm 48 and a bifurcated attaching member 50 which is suitably bolted to a downturned portion of one of the arm supports 32. Optionably, attaching member 50 could be attached to another portion of frame 22.

Figure 6:
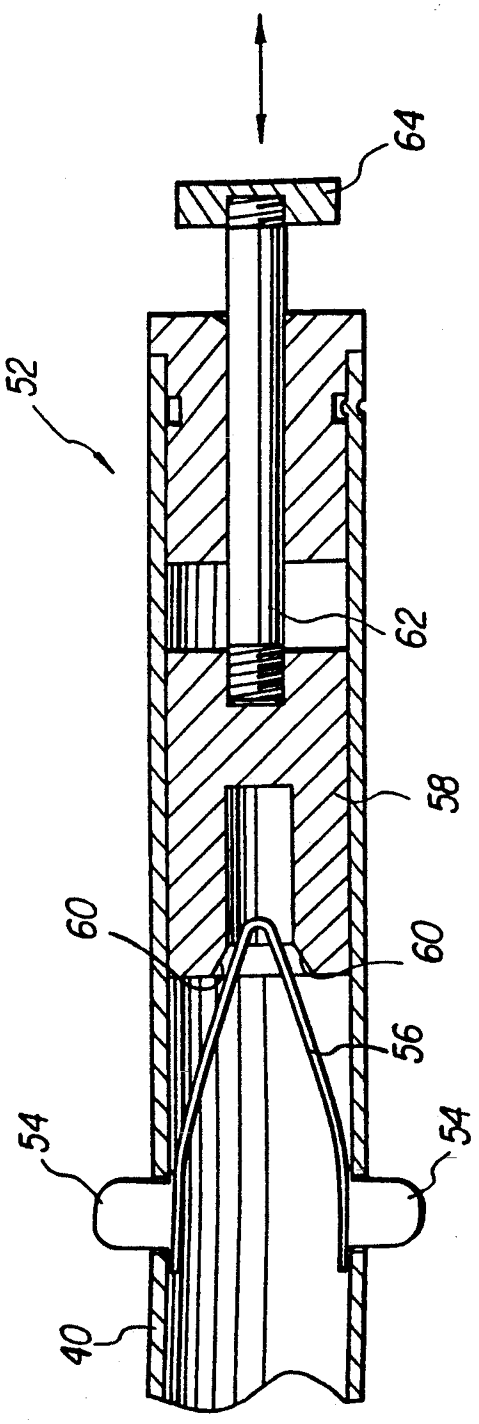
FIG. 6 is a fragmentary elevational view illustrating a quick connect/disconnect mechanism for the tray carrying arm of FIG. 1.
Figure 7:
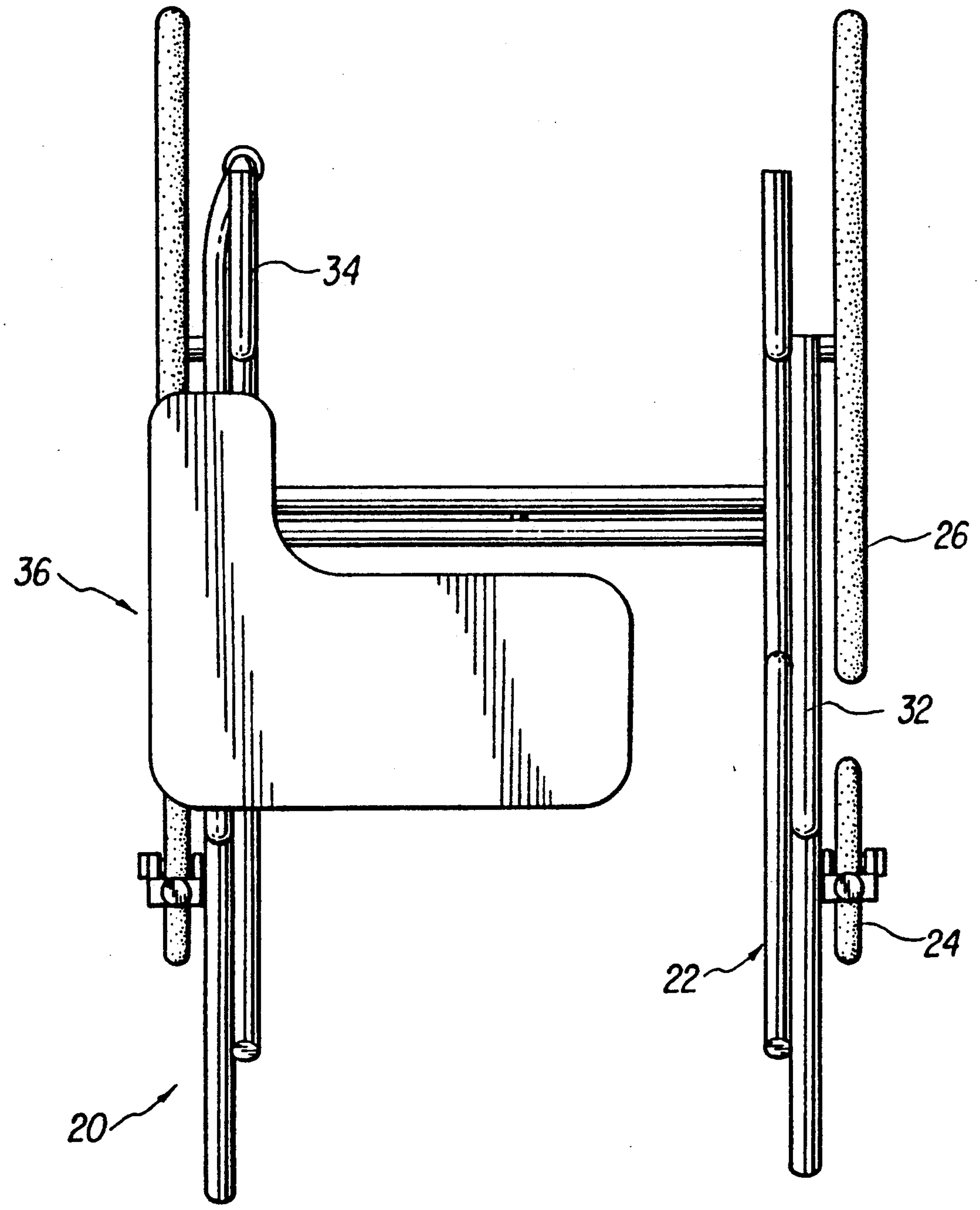
FIG. 7 is a top plan view of FIG. 1 with portions removed and drawn to an enlarged scale.
Figure 8:
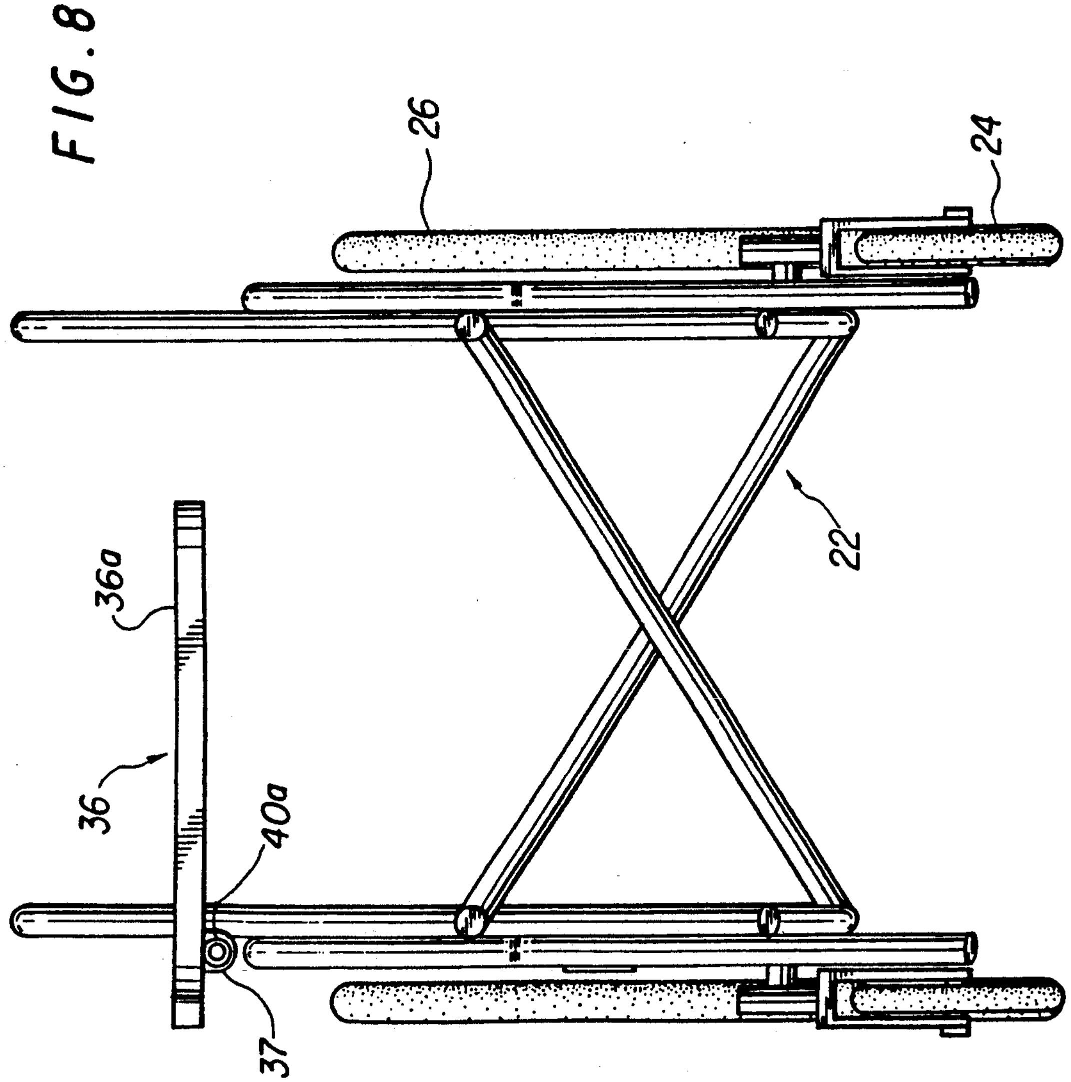
FIG. 8 is a front elevational view of FIG. 1 with portions removed and drawn to an enlarged scale.

One mechanism for permitting rotation of the tray with respect to rotatable tubular member 40 so as to reach the phantom positions depicted in FIG. 1 and FIG. 2 is schematically illustrated in FIG. 6 and further shown in FIGS 8 and 9. As shown in FIGS. 8 and 9, tray 36 includes a depending U-shaped sleeve 37, which, as seen in FIG. 8 is positioned on horizontal portion 40*a* of tube member 40, FIG. 6 shows the rotator means generally by numeral 52. Depressible tab locking members 54 are diametrically opposed. Spring-like leg members 56 are secured to the locking tab members 54 and are squeezed or depressed by movement to the left in FIG. 6 of a reciprocable piston 58. Piston 58 is provided with camming surfaces 60 to engage the leg members 56 and a hollow portion to receive the depressed leg members. A bolt actuator 62 is threaded into reciprocal piston 58 as shown in FIG. 6 and a head 64 which may be easily grasped.

Figure 3:
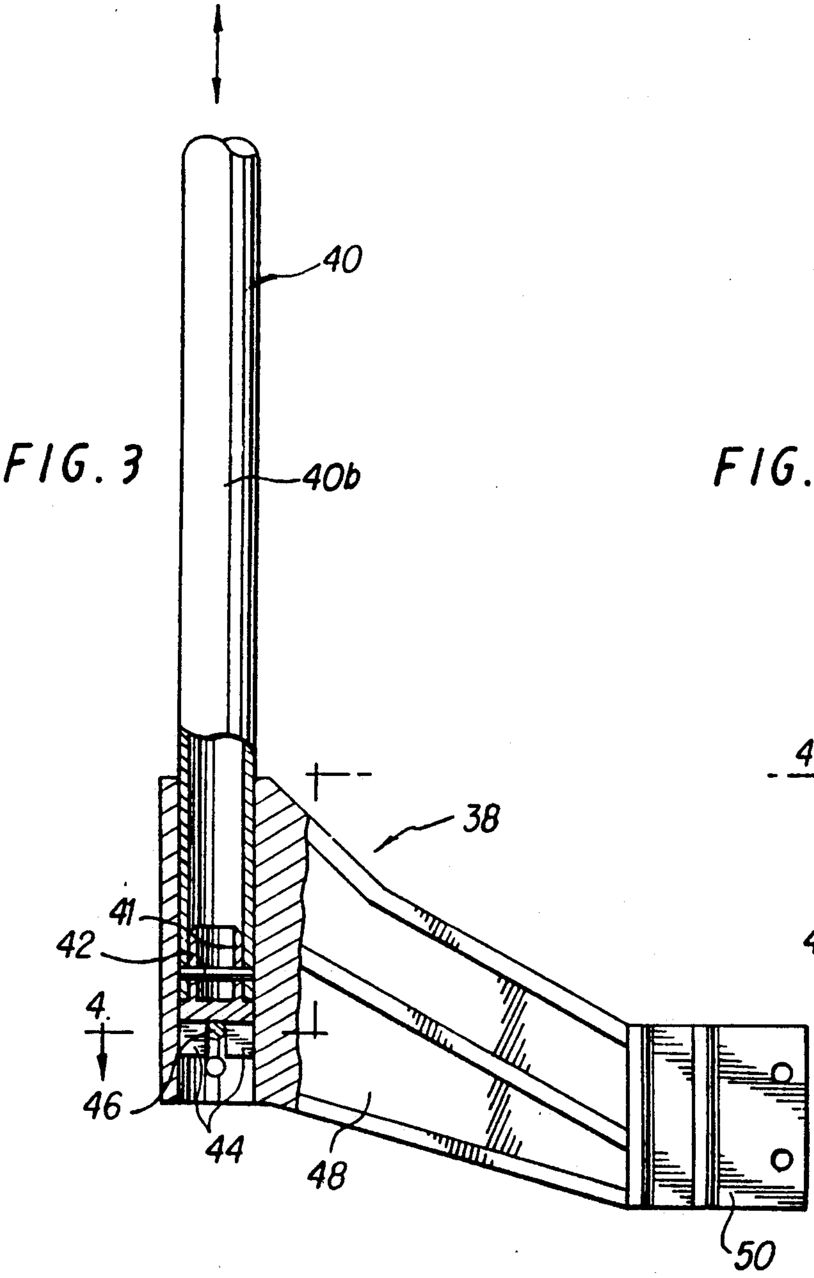
FIG. 3 is a fragmentary elevational view taken partially in vertical cross section and drawn to an enlarged scale showing the tray lift arm of FIG. 1.
Figure 4:
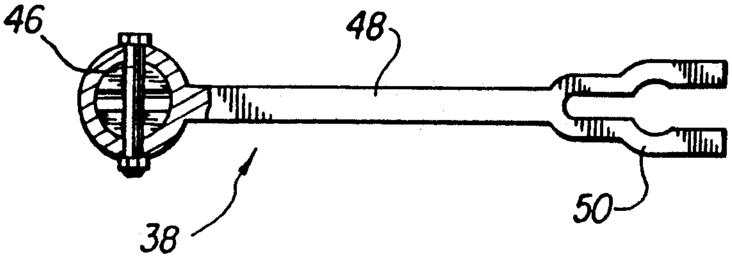
FIG. 4 is an elevational view of the tray lift arm of FIG. 3 taken along line 4—4 of FIG. 3.

In order to release the tray, piston 58 is moved to the left in FIG. 3 so as to engage and depress leg members 56 until depressible tab locking members 54 clear the tubular member and sleeve 37 and permit rotation of the horizontal portion 40*a* of tray with respect to tube 40, which thus provides a horizontal axis for rotation of tray 36, to reach either of the phantom positions for the tray 36 in FIGS. 1 and 2. The reciprocal piston 58 is then moved to the right in FIG. 3 to reestablish a locked position by emergence of tab locking members in a new set of slits around the periphery of tube 40, not shown.

The invention has been illustrated and described with respect to a preferred embodiment thereof, but various changes and modifications may be made therein without departing from the spirit of the claims which follow.

We claim:

1. In a wheel chair construction of the type which is provided with a frame construction for attaching front and rear wheel members, generally vertical rear and generally horizonal bottom seat members, arm supports having generally horizontal top surfaces and rear push means, the improvement which comprises:

a. a pivotal tray means, said tray means having a planar surface;

b. rotatable means for holding said pivotal tray means and for rotating said pivotal tray means from a first position in which said planar surface is generally horizontal and generally parallel to said top surfaces of said arm supports to a second position in which said planar surface is generally vertical and generally parallel to and behind said rear seat member.

2. A wheel chair construction as claimed in claim 1 including means for releasably locking said pivotal tray means in said first position.

3. A wheel chair construction as claimed in claim 2 including means for unlocking said means for releasably locking said pivotal tray means whereby said pivotal tray means may be rotated about a horizontal axis where said pivotal tray means is releasably re-locked in an up position in which said planar surface is generally vertical and to one side of said wheel chair to permit a user of said wheel chair to get up from and return to said bottom seat member.

4. A wheel chair construction as claimed in claim 1 including means for releasably locking said pivotal tray means in said second position generally parallel to and behind said rear seat member.

5. A wheel chair construction as claimed in claim 1 wherein said rotatable means for holding said pivotal tray means is rotatable about a vertical axis.

6. A wheel chair construction as claimed in claim 5 wherein said rotatable means for holding said pivotal tray is normally locked in position and is released for rotation by vertically lifting said rotatable means.

* * * * *

UNITED STATES PATENT AND TRADEMARK OFFICE

CERTIFICATE OF CORRECTION

PATENT NO. : 5,299,824

DATED : April 5, 1994

INVENTOR(S) : Richard D. Roberts and Matthew J. Murphy

It is certified that error appears in the above-identified patent and that said Letters Patent is hereby corrected as shown below:

Col. 2, line 13, --32-- is inserted after "supports".

Col. 2, line 14, "32" is deleted before "and".

Col. 2, line 54, "abut" is changed to "about".

Col. 3, line 2, "," is changed to --.--.

Signed and Sealed this

Sixth Day of September, 1994

*Attest:*

BRUCE LEHMAN

*Attesting Officer*

*Commissioner of Patents and Trademarks*